United States Patent [19]

Guthy

[11] Patent Number: 5,196,123
[45] Date of Patent: Mar. 23, 1993

[54] METHOD AND APPARATUS FOR OIL SEPARATION FROM CONDENSATE

[75] Inventor: Robert W. Guthy, Fort Salonga, N.Y.

[73] Assignee: Scales Air Compressor Corporation, Carle Place, N.Y.

[21] Appl. No.: 875,991

[22] Filed: Apr. 29, 1992

[51] Int. Cl.⁵ .................... B01D 17/02; B01D 17/025
[52] U.S. Cl. .................................. 210/663; 210/799; 210/86; 210/95; 210/519; 210/533; 210/538; 210/539; 210/540; 210/694; 210/804; 210/806; 210/262; 210/265
[58] Field of Search ................. 210/663, 799, 121, 86, 210/95, 519, 532.1, 533, 538, 539, 540, 694, 804, 806, 259, 262, 265

[56] References Cited

U.S. PATENT DOCUMENTS

| 240,910 | 5/1881 | Koellner | 210/262 |
|---------|--------|----------|---------|
| 2,181,263 | 11/1939 | Dehn | 210/262 |
| 3,339,736 | 9/1967 | Muller | 210/262 |
| 5,053,145 | 10/1991 | Ellison | 210/262 |
| 5,069,796 | 12/1991 | Fox | 210/664 |
| 5,143,611 | 9/1992 | Pate, Jr. | 210/256 |

OTHER PUBLICATIONS

8 Sheets Manufacturer's Catalog Pages, Josam Company, Michigan City, Indiana (B1–B8).
Summit Oil Company, Inc., ConDeSep TM Oil/Water Separator, 4 pages.

Primary Examiner—Peter Hruskoci
Assistant Examiner—Cynthia L. Nessler
Attorney, Agent, or Firm—George J. Brandt, Jr.

[57] ABSTRACT

Separation of oil from an aqueous condensate is effected by feeding the condensate into the headspace of a liquid pool containig separation tank so that a layer of oil will settle on top of water in the pool. An oil-receiver tank above the separation tank and connected thereto by a vertical pipe, also has a liquid pool therein above which a head space at sub-atmospheric pressure exists. Oil in the layer is accessed with a lower entry to the vertical pipe submerged below the separation tank liquid level and ascends into the pipe and upwardly to the oil-receiver tank, the oil ascent being accompanied by descent of water from the liquid pool in the oil-receiver tank. When the oil-receiver tank and an upper section of the vertical pipe are filled with oil only, the oil-containing tank can be drained. Separation operation can resume following reestablishment of the liquid pool in the oil-receiver by inletting a quantity of clean water thereto.

19 Claims, 2 Drawing Sheets

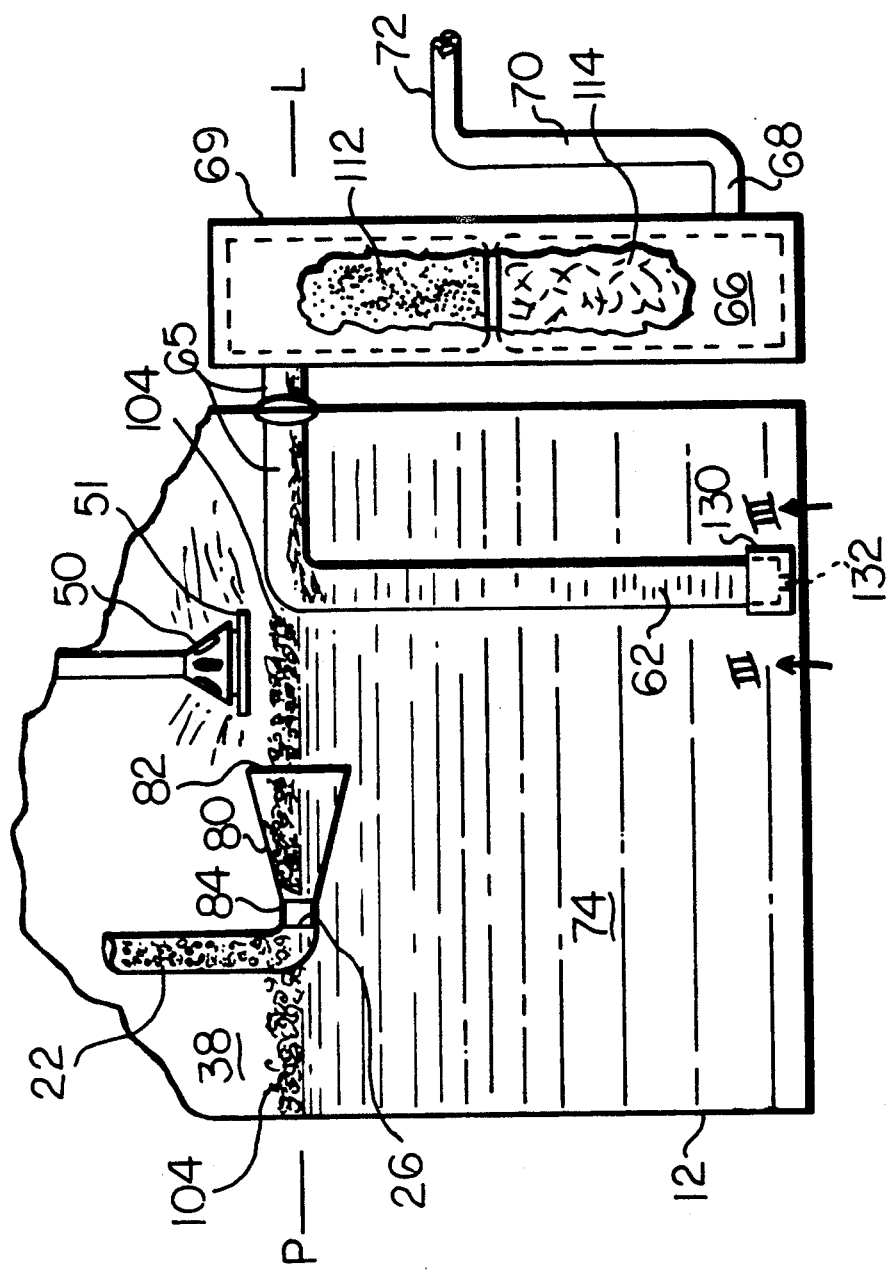
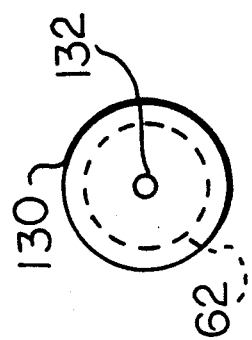
FIG. 2
FIG. 3

METHOD AND APPARATUS FOR OIL SEPARATION FROM CONDENSATE

BACKGROUND OF THE INVENTION

The present invention relates to handling of oil-containing media, primarily water, associated with industrial operations in manner as allows safe, economical separation of the oil from the water so that the oil easily can be disposed of or recycled without presenting hazard of oil entry into a sewage or waste system to which water separated from oil is discharged.

Certain industrial operating systems produce condensate which in many cases is discarded, as by discharge to a municipal sewage operation or a septic system. If the condensate contains a lubricant such as oil, that component represents a pollutant which, could for example, leech into fresh water wells or have other adverse consequence for the environment.

The danger presented by possible discard of an oil-containing condensate into a sewage system or into the ground has led to enactment by local governments of laws and/or regulations governing disposal of oil and oil-containing water. For example, condensate from an air compressor system must either be separated mechanically with centrifuges and like devices, or the condensate must be collected in its entirety and carted off to authorized disposal activities.

Where discharge is to ground or a sewage system, local regulations may set a standard as to what oil content can be present in the water. Such could, for example, be presence of not more than 20 p.p.m. oil.

In large industrial operations, it is practical to install and employ mechanical separation in which oil is effectively separated from condensate, and the water remaining which is essentially oil-contamination free, can be discharged to a sewer or septic system. In many industrial operations, the size of such and a condensate production rate may not justify the large investment involved for a separation equipment installation. Commonly then, and to adhere to the applicable locality requirements for disposal, the condensate must be collected as such, stored in prescribed containers and the containers taken to a collection station or operation where separation will be effected.

This last-mentioned handling of condensate presents the producer with expense to store and dispose of the condensate as well as obliging the on-premise establishment of a storage area. Since condensate produced, for example, in air compressor operations is comprised of only about 2% oil, the remaining 98% being water (there also can be air presence in the condensate), the producer is faced with the need to handle and store a large bulk of water that eventually will be discharged to sewage but only after the condensate is delivered to a collection depot, and the condensate freed of any oil presence therein at least down to a required level.

It is desirable, therefore, that a simplified, generally inexpensive yet highly effective means for and manner of separating oil from a condensate be provided for employment by industrial and commercial operations where use of traditional, high cost separation systems is not practical or economically feasible.

OBJECTS AND SUMMARY OF THE INVENTION

Accordingly, it is an object of the invention to provide method and apparatus for separating oil from an oil-containing condensate to the extent that following separation there remains an essentially only oil fraction, and a water fraction oil free enough for direct discharge to a sewage or septic system.

It is a further object of the invention to provide oil separation method and apparatus particularly suited for use in medium and small size industrial/commercial operations where low cost investment for procurement of same is desirable.

It is a still further object of the invention to provide an oil separation method and apparatus for separating oil from a condensate which is simple to operate for the intended purpose.

Another object is to provide method and apparatus for separation of oil from a condensate which eliminates need to store water recovered from condensate or the condensate itself since, the method and apparatus are effective to produce a separated water fraction containing as low as about 10-15 p.p.m. of oil, which renders it suitable for discard to ordinary waste systems.

Another object is to provide separating apparatus which does not require any complex or moving components so that the apparatus is not only relatively inexpensive to make but also has a very long service life potential.

A still further object is to provide separating apparatus which embodies passive but readily indicative means for ascertaining when separated oil should be drained from the apparatus.

In accordance with the invention, the apparatus includes a separation tank in which oil separation from a condensate can ensue, and an oil-receiver or oil-holding tank fixed above the separation tank, the interiors of the two tanks being connected by a vertical pipe extending from a lower part of the oil-receiver tank down into the separation tank to a location that is submerged below a separation tank normal liquid level of predetermined height when the apparatus is functioning in an oil separation mode, this pipe having a blocking valve therein so that the pipe flow course can be blocked at certain times during apparatus use.

The separation tank has a top head fitted with a vent that maintains the separation tank interior in communication with normal atmospheric pressure, and also includes a fitting through which a flow of oil-containing condensate can be introduced into the separation tank, the fitting being connected to a downcomer pipe inside the separation tank which terminates in a spray head so that admitted condensate flow enters the separation tank interior in discrete form of spray particles as same facilitates and promotes separation of oil from the flow.

An impact plate is provided closely spaced under the spray head so that the condensate inflow impacts thereagainst and is diverted laterally to prevent its striking the pool surface where it could undesirably agitate a collected oil layer floating on top of the pool.

Level control and liquid outflow means is fitted in the separation tank so that in use, a constant level height of liquid can be maintained in the separation tank by effecting an outflow of water therefrom at a rate compensating for introduction thereto of water separated from admitted condensate. This level control can include a pipe open at a bottom thereof proximal a bottom of the separation tank and fitted with a metering cap, the pipe passing up in the separation tank and then laterally out a tank sidewall at a height proximal the maintained level in the tank, the pipe delivering water to an external filter unit which is filled with, e.g., activated charcoal and absorbent material which serve to filter oil trace from the outflow, the effectiveness of the apparatus as supplemented by the filtration being such as to achieve, in many applications, as low as about 10 p.p.m. oil presence in the outflow.

The level control and liquid outflow means is operable to provide an outflow rate such as to prevent temporary presence of super atmospheric pressure condition (e.g., 100 psig) present above the separation tank pool surface from forcing the pool level down from the predetermined level a distance which would result in a normally submerged air excluding course by which the floating oil layer accesses a lower entry to the vertical pipe, become uncovered and a vacuum present in a head space of the oil-receiver tank destroyed.

The oil-receiver tank which generally will be only about one-fifth or so the volumetric capacity of the separation tank is provided at a top head thereof with a vacuum condition gauge and with a normally closed vent fitting for selective communication of that tank interior with atmospheric pressure at stated times. The oil-receiver tank also has drain means fitted at the bottom thereof which drain means includes a pipe manifold having a drain pipe fitted with a stop valve and a fill section which also is fitted with a stop valve.

The vertical pipe connecting the oil-receiver tank with the separation tank has a sight glass section therein which serves to allow visual observation of the condition of any liquid in the vertical pipe at the sight glass location, the existence of oil only presence observed through the sight glass being indicative of condition that the oil-containing tank be drained since it is filled with oil only as well. The oil-receiver tank may also be fitted with an externally mounted tube type level indicator.

In using the apparatus, the separation tank initially is filled with water from a suitable source up to the predetermined liquid level in the tank leaving a head space above the water level in the tank. The vent on the oil-receiver tank is opened, the valve in the vertical pipe is put in blocking position, the drain pipe valve oriented to closed position, and a supply hose connected to the fill section of the pipe manifold with the valve in the fill section open.

The oil-receiver tank is then filled with water from the clean water source, filled tank condition being achieved when water flows out the tank vent and through a hose return to the separation tank. The vent and the fill section valves then are closed since the oil-receiver tank is now filled with water.

The blocking valve in the vertical pipe is then opened. In consequence, a certain volume of water will gravity feed from the oil-receiver tank into the vertical pipe and create a sub-atmospheric or vacuum condition head space over the liquid remaining in the oil-receiver tank. A water column will fill the vertical pipe, this column being draft maintained elevated between a below surface location in the liquid pool in the separation tank and a below surface location in the pool in the oil-receiver tank by the effect of the difference between the atmospheric pressure in the separation tank headspace and the sub-atmospheric pressure in the oil-receiver tank head space.

A flow of oil-containing condensate such as from an air compressor system is then admitted to the separation tank head space in spray form thereof. Oil fraction will start to separate from water fraction due to spray breakup enhanced by impact against the impact plate, and this oil fraction and water fraction will fall to the top of the tank liquid pool. The lower specific gravity oil collects as a layer on top of the water in the tank and separated water settles to the pool.

A gathering horn is fitted in the separation tank, and its conical-shaped structure locates in an array that extends both above and below the predetermined tank level. The gathering horn provides an air-excluding flow course for the oil in the layer to access a lower entry end of the vertical pipe, a small end of the horn being connected to the vertical pipe lower entry end. Since the oil accessing the vertical pipe lower end is lighter than water, the oil will ascend in the vertical pipe and eventually enter the pool in the oil-receiver tank. The ascending oil flow displaces water from the oil-receiver tank and eventually from the vertical pipe, this descending water having final passage into the pool in the separation tank.

Accumulation of separated water in the separation tank is compensated by an outflow from that tank through the outflow pipe so the predetermined pool level is maintained. Eventually, the pool in the oil-receiver tank will be exclusively oil as will an upper part of the liquid column in the vertical pipe, this condition being observable through the sight glass and by way of the external tube level indicator on the oil-receiver tank. The oil-receiver tank is then ready for draining which proceeds by closing the blocking valve in the vertical pipe, connecting the drain pipe on the oil-receiver tank by hose with a collection vessel, e.g., a 55 gallon drum (the drum being used to take the collected oil to an authorized disposal), and then opening the tank vent and the valve in the drain pipe.

At the end of drain flow from the oil-receiver tank, the apparatus can be recharged for continued separation by again recharging the oil-receiver tank with water, closing that tank vent, the drain valve and opening the blocking valve in the vertical pipe. The liquid in the oil-receiver tank will in part feed out of the tank in manner as followed the initial start up, and separation will continue as above described.

The size of the apparatus will depend on particular need and practical consideration of how often draining should be carried out. For many requirements the apparatus capacity need not be very large, and this has the advantage of making the apparatus readily transportable to numbers of use locations in a factory etc. In one form, an apparatus having a 5 gallon capacity oil-receiver tank and a 30 gallon capacity separation tank (in use holding about 21 gallons of oil/water) was found suited for a number of industrial applications. In that capacity of apparatus, the sub-atmospheric pressure produced in and present in the oil-receiver tank during separation was about 2 to about 2 and ½ inches of vacuum.

The invention also provides that the water outflow from the separation tank be passed through separate activated charcoal and absorbent material masses to remove oil trace therefrom. In actual practice, oil presence of as low as 10 p.p.m. in the outflow water has been achieved.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a fragmentary elevational depiction of a lower section part of the separation tank illustrating the principles by which the separation of oil from the condensate is effected in accordance with the invention; and FIG. 3 is a bottom plan view, on enlarged scale, taken along line III—III in FIG. 2 showing details of the metering cap.

DETAILED DESCRIPTION OF THE PREFERRED EMBODIMENT

Figure 1:
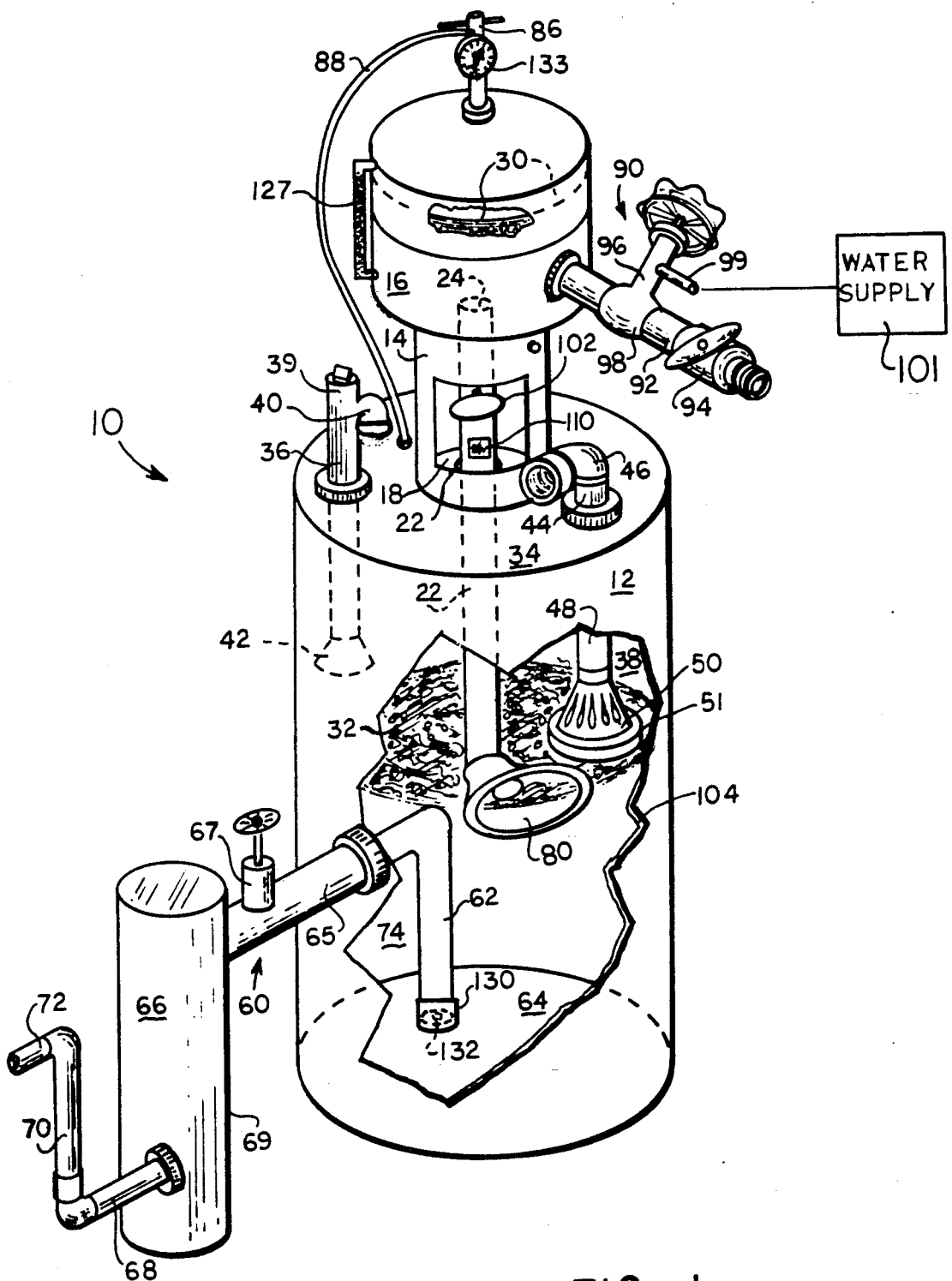
FIG. 1 is a perspective view of the apparatus, a portion of the separation and oil-receiver tanks being cut away to show internal structural arrangements thereof.

While the method and apparatus of the invention are described herein in terms of use for separating oil from condensate from air compressor condensate drain systems, it will be understood that same can be used for effecting such separation in other systems, for example, the treatment of other oil-containing streams such as one produced in commercial grinding operations where water and lubricant agents are directed against workpieces during grinding.

The apparatus 10 shown in FIGS. 1 and 2 is characterized by its compact construction and facility for handling of same to locate it in a requirement space. The apparatus can be sized to a particular separation need but generally an apparatus need not be physically large since its operation can be continuous with interruption occurring only for a very short time while a separated oil volume is drained from the after described oil-receiver tank.

Apparatus 10 is relatively inexpensive to make and its components provided from readily available sources and types of materials. For example, the tank components and piping can be made of synthetic materials of a polymer class or from light gauge metals. Capacities can be varied but as noted earlier, an oil-receiver tank of about 2-5 gallons used in conjunction with a separation tank of about 20-30 gallon size is well suited for many industrial condensate separation requirements.

Referring to FIG. 1, apparatus 10 includes a separation tank 12, a pedestal 14 fixed on top of the separation tank, and an oil-receiver tank 16 fixed on top of the pedestal, the tanks and pedestal being of the generally cylindrical profile shown, with the oil-receiver tank 16 having convex upper and lower heads, and the pedestal a cut out opening as at 18. A vertical pipe 22 interconnects the interiors of the tanks 12 and 16, with the pipe having an upper open end 24 located at the bottom of tank 16, and a lower entry end as at 26 (FIG. 2) located in the separation tank. These ends of the pipe will for the one, be located below a liquid level 30 in the tank 16, and submerged below a liquid level 32 in tank 12 for the other.

The top head 34 of separation tank 12 mounts a vent line 36 which serves to communicate a head space 38 in the tank to normal extra-tank atmospheric pressure, the vent being a vent tube having a reverse turn nipple 40 at an air entry end, and a flared lower end fitting 42 which can carry a screen, this fitting serving to bar any undesirable outward surge flow of air from the head space which could carry oil therewith to the outside. Vent line 36 is a Tee-fitting with a capped branch 39 which can be opened when tank 12 is to be filled with water at start up.

Top head 34 also is fitted with a condensate admission tube unit 44, this unit including elbow 46 and tube length 48, the tube length terminating with a spray head 50 spaced a distance above the predetermined level in tank 12 and provided so that an oil-containing condensate inflow to tank 12 will be as a spray, broken into discrete particle form to initiate and promote oil fraction separation from the water fraction with any condensate trapped air presence being liberated in this breakup.

Connected with spray head 50 and closely spaced below it, is an impact plate 51. This impact plate is provided so that condensate inflow (delivered from a condensate system at super-atmospheric pressure, e.g., 100 psig) will impact against the plate. This serves to divert super-atmospheric pressure inflow which if allowed to flow directly down against the pool surface in tank 12, would undesirably agitate an oil layer thereon emulsifying it and interfering with intended oil separation.

Presence of super atmospheric pressure above the pool level could force the pool level down to or below the lower entry to pipe 22. Such is undesirable and its effect countered by use of a metering cap in pool level control means as will be described later on.

Tank 12 also is provided with level control means shown generally at 60 for maintaining a liquid level at predetermined height above the pool bottom. This means 60 includes a tube length 62, vertically positioned in the tank to have a lower entry end thereof positioned close to the bottom 64 of tank 12, e.g., within about a half-inch from the bottom. Tube length 62 extends upwardly and then turns laterally in pass through of a side wall of the tank being joined with an external horizontal tube length 65 that enters the upper part of a filter housing 66, the housing having at a lower part another horizontal tube element 68 that joins a vertical tube run 70 which undergoes at proximal tank predetermined level height, transition to a horizontal liquid outlet tube 72. Tube length 65 can include a shut-off valve 67 therein.

The arrangement last-mentioned will function to cause outflow of water from the liquid pool 74 in tank 12 at a rate compensating for an introduction rate thereto of water entering the pool as separated fraction, all as will be dealt with in some more detail later.

Tank 12 also is fitted interiorly with a gathering horn 80, this component being of the conical funnel configuration shown so that it has converging body form from a wide diameter end as at 82 to a small diameter end as at 84, the latter being connected to the lower entry end of vertical pipe 22. Gathering horn 80 it is seen is disposed so that its encircling wall shape locates both above and below the predetermined pool level in the tank 12.

Oil-receiver tank 16 is fitted at the top head thereof with a normally closed vent 86 valve carried above a vacuum gauge 133 on top of the tank and which registers head space vacuum in tank 16, and a transparent return line 88 which is used to convey any liquid that would outflow the vent during a tank 16 filling to the pool in tank 12. Oil-receiver tank 16 also is fitted at a bottom exterior side thereof with a pipe manifold 90. This pipe manifold includes a drain pipe length 92 which carries a stop valve 94, and a fill section 96 embodied as another stop valve 98 having a fill fitting 99 thereon.

Description of how the apparatus 10 is used now will be given continuing reference being made to both FIGS. 1 and 2 during that description. First, separation tank 12 will be charged with water to fill it to the level P-L (FIG. 2). Then oil-receiver tank 16 will be filled with water. To do this, vent valve 86 is opened and valve 102 and valve 94 are closed. A fill hose (not shown) is attached to fitting 99 and valve 98 opened so that water from source 101 can feed into tank 16. When tank 16 is filled as shown by observation of water flow in return line 88, valve 98 is closed and the fill hose disconnected. Vent valve 86 is then closed.

Valve 102 in pipe 22 is then opened in consequence of which a certain portion of the liquid in tank 16 will gravity feed down into pipe 22 and depending on volumetric consideration involved in a particular size of apparatus, may also feed into pool 74 leaving an evacuated head space above the level 30 of the liquid in tank 16. Pipe 22 will remain filled with liquid due to the drafting effect of the difference in pressure between that in the head space of tank 12 (atmospheric) and that in the head space above the pool in tank 16 (sub-atmospheric, e.g., about 2 to 2 and ½ inches of vacuum). At the outset, all liquid in the apparatus is water.

A flow of oil-containing condensate from a condensate drain system is then supplied to the apparatus via the admission tube unit 44, the condensate entering tank 12 head space as a spray. In many applications, tube unit 44 will be permanently connected to the condensate drain system. The inflow will strike the impact plate 51, flow laterally in the head space and break up with oil fraction separation from the water fraction taking place. Separated oil will fall to the surface of the pool and start accumulating thereon by reason of its lower specific gravity. If any oil submerges below level P-L it will float back up to the oil layer 104.

With the oil layer building up, it will in course enter the reach of the gathering horn 80 and be directed toward the narrow end. This narrow end 84 is connected at submerged location with the lower entry end to pipe 22 and the vertical positioning of the gathering horn relative to level P-L is such that the course of communication of the oil layer with the pipe lower entry end is of air-excluding character. This oil can access the pipe 22 and ascend upwardly therein to flow into the tank 16. This oil upward flow is accompanied by downward flow of displaced water to the pipe 22 and pool in tank 12.

During the separation of oil, separated water fraction will enter the tank 12 pool but level P-L will remain at the predetermined height therefor due to compensating outflow of water from the tank 12 by way of the level control means 60.

In time, the separated oil will displace all water from the tank 16 and an upper portion of pipe 22. When exclusively oil is seen in sight glass 110 of pipe 22 or observed through external tube level indicator glass 127 on tank 16, this indicates tank 16 should be drained. To do this, valve 102 is closed, a discharge hose or other means is connected to drain pipe 92, valve 94 is opened and so is vent valve 86. Tank 16 will then become drained substantially of the oil therein, this oil being collected in suitable vessels and eventually taken to an authorized disposal operation.

To carry on the separation operation, tank 16 will again be charged full with water and with opening of valve 102, the sub-atmospheric head space condition reestablished therein.

In the subsequent and continuing operation of the apparatus, undrained oil presence may be found in the pool comprising water in the tank 16, but this oil will float to the pool surface. Similarly oil, may be present to some extent below the pool surface in tank 12. This oil too works its way up to the oil layer. The deeper the location water is at in the pool 74, the less oil presence therein. The water exiting pool 74 by way of the level control means is essentially oil-free. Further, the filter 66 functions to remove any oil trace from the outflow of pool 74. The filter has disposed in the housing 69 thereof, serially arranged masses of absorbent material 112, such as SPC oil sorbent as made by Sorbent Products, Inc., and of activated charcoal 114. Passage of the outflow through these masses effects oil trace removal so that any oil presence in the outflow is about 10–15 p.p.m., a level making it safe for discharge of the outflow to ordinary waste systems. The masses 112, 114 can be contained in bags, and thus, replacement of the masses when spent is easily carried out.

Apparatus separation capacity will depend on the size of the tanks used. In the FIGS. 1 and 2 apparatus, about 16 gallons per hour of condensate can be handled and oil separated therefrom. The operation is further marked by absence of any lubricant scum-like presence in tank 12.

Reference is made now to FIGS. 2 and 3. As will be seen, the level P-L is at a certain predetermined distance above the bottom of tank 12. Generally, that height depicted is where the level will remain. On occasion, the level may rise if a surge of condensate enters tank 12. This is not a disadvantage in that if the oil layer 104 be raised above entry to the lower end of pipe 22, the outflow from the tank via pipe 62 will soon reduce the level back to the predetermined level P-L. The important consideration is that the level not fall or be pushed down to an extent that air in the head space 38 can enter the lower end of pipe 22 as this would destroy the liquid column in the pipe 22 and the vacuum in the head space of tank 16.

The principal cause of depressing the level of pool 74 is entry of super-atmospheric condensate inflow to tank 12. To insure that no above atmospheric level in the headspace of tank 12 can function to force a rate of water out through pipe 62 that the entry 26 to pipe 22 would be uncovered, a metering cap 130 is fitted to the lower end of pipe 62. This metering cap contains a small orifice 132 therein (of, e.g., 3/16ths inch diameter) through which outflow must pass. This then controls the outflow rate so that super atmospheric pressure effect is no longer a factor and the outflow rate is one that cannot lower the level P-L to any significant measure, and particularly down to the location of the lower entry of pipe 22 at which level if such occurred, the vacuum in the oil-receiver tank head space, and the oil air-excluded flow course would be destroyed and the separation operation terminated. Any super atmospheric pressure presence in the headspace of the tank 12 is temporary only, and readily disappears via vent 40 and water outflow ensues at a rate dictated by the height of level P-L only.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for treating an oil-containing aqueous condensate to separate oil therefrom, said method comprising confining first and second pools of liquid each comprising water in respective ones of vertically spaced upper and lower enclosed spaces wherein a head space is present above a surface of the pool in each space with the head space in the upper enclosure evacuated to a sub-atmospheric pressure, the head space in the lower enclosure being in communication with atmospheric pressure, establishing a vertical liquid column communicating a below surface location in the first liquid pool with a below surface location in the second pool, a difference between atmospheric pressure in the lower enclosure head space and the sub-atmospheric pressure in the upper enclosure head space draft maintaining the liquid column between said two below surface locations, introducing a flow of an oil-containing water condensate into the head space of the lower enclosure in discrete mass form thereof and in an impacting flow against an impact surface to dissipate effect of any super-atmospheric condensate pressure thereby to promote separation of oil from the condensate, separated lower specific gravity oil accumulating as an oil layer at the top of said second water pool, higher specific gravity water passing to the second liquid pool, communicating in air-excluding course the oil layer with the below surface location in the second liquid pool whereby oil therein can access and enter the liquid column and ascend through the liquid column into the first liquid pool, the ascending lighter oil displacing heavier water from the first liquid pool which displaced water descends into the second liquid pool, outflowing water taken from a location at the bottom of the second liquid pool at a rate compensating for an introduction rate thereto of water separated from the condensate so as to maintain a level height of the surface of the second liquid pool at least a predetermined distance above a bottom of the pool while restricting the outflow rate to one at which temporary presence of a super atmospheric pressure condition in the lower enclosure head space is ineffective to force the second liquid pool surface downwardly to the said below surface location, and gravity draining oil accumulated in the upper enclosed space when a liquid presence in the liquid column above a certain height therein is exclusively oil, the gravity draining being effected from a bottom location in the upper enclosed space by venting the head space of the upper enclosed space to atmosphere and with communication of the liquid column between said first and second liquid pools blocked.

2. The method of claim 1 in which the flow of oil-containing water condensate is introduced into the lower enclosure head space as a spray form thereof.

3. The method of claim 1 in which the sub-atmospheric pressure in the head space of the upper enclosure is between about 2 and 2 and ½ inches of vacuum.

4. The method of claim 1 further comprising subjecting the water outflow from the second liquid pool to a filtering treatment to remove any oil trace presence therein.

5. The method of claim 4 in which the filtering treatment includes contacting the second liquid pool water outflow serially with an absorbent material and with activated charcoal.

6. The method of claim 1 further comprising upon a completion of gravity draining of oil from the upper enclosed space, the step of admitting from an external source thereof an enclosure filling quantity of water to said upper enclosed space so that upon a subsequent isolation of the upper enclosed space from atmospheric pressure and unblocking of communication in the liquid column, some of the liquid in the upper enclosed space will gravity down feed from the upper enclosed space and reestablish a sub-atmospheric pressure head space therein.

7. Apparatus for treating an oil-containing aqueous condensate to separate oil therefrom, said apparatus comprising a separation tank for holding a pool of liquid comprising water therein, the separation tank including level control means for maintaining a liquid level therein at least a predetermined height above a bottom of the pool, with there being a head space above the liquid level, the separation tank having vent means for communicating the head space with normal atmospheric pressure, an oil-receiver tank for holding a second liquid pool comprising water located a distance above said separation tank, the oil-receiver tank having a normally closed vent for selectively communicating an oil-receiver tank interior with normal atmospheric pressure, a vertical pipe connecting a lower interior portion of the oil-receiver tank with the interior of the separation tank at a location below the predetermined level therein, said pipe having a blocking valve therein so that with said valve in a blocking position and the vent means thereof in an open position, the oil-receiver tank can be filled with liquid, at least some of said filling liquid with the valve in unblocking position and with the oil-receiver tank vent closed, outflowing the oil-receiver tank into the separation tank and into the pipe as a liquid column in the latter maintained elevated above the liquid level in the separation tank by a differential of pressure between the atmospheric pressure in the separation tank head space and a sub-atmospheric pressure in an oil-receiver tank head space created by liquid outflow from the oil-receiver tank, means for admitting a flow of an oil-containing water condensate into the separation tank head space in a discrete mass form thereof to promote separation of oil from the condensate, separated lower specific gravity oil accumulating in the separation tank as an oil layer at the top of the liquid pool in the separation tank, higher specific gravity water from the condensate passing into the separation tank liquid pool, said means for admitting further including an impact/diverter plate against which the condensate inflow impacts and is diverted to a lateral flow in the head space, means for communicating the oil layer in an air-excluding course with a pipe lower entry at the said location below the predetermined level in said separation tank whereby oil in the layer accesses and enters the liquid column and ascends therethrough to displace water at levels thereabove, displaced water gravity descending towards the separation tank pool, the separation tank level control means being operable to outflow water from the separation tank at a rate compensating for an introduction rate thereto of water separated from the condensate but such outflow rate being one at which temporary presence of a super atmospheric pressure condition in the separation tank head space is ineffective to force the liquid level therein downwardly to the said location below the predetermined level, and drain means at a bottom location on said oil-receiver tank, said drain means being operable in conjunction with orientation of the oil-receiver tank vent to an open position, whenever liquid presence in the vertical pipe at a certain height above the predetermined level in the separation tank liquid pool is exclusively oil and thereby indicative of presence of only oil in said second liquid pool, for draining said second liquid pool to an extra oil-receiver tank location.

8. The apparatus of claim 7 in which the level control means for maintaining a predetermined level in the separation tank includes an outflow pipe extending upwardly from an entry thereto submerged in the separation tank liquid pool adjacent the bottom thereof to a tank pass through location thereof at a level proximal that of the pool liquid level predetermined height.

9. The apparatus of claim 8 in which a filtering unit is disposed in the outflow pipe course for filtering water outflowing the separation tank to remove oil trace therefrom.

10. The apparatus of claim 9 in which the filter unit contains a mass of activated charcoal.

11. The apparatus of claim 9 in which the filter unit contains a mass of absorbent material.

12. The apparatus of claim 9 in which the filter unit contains a mass of absorbent material, and a separate mass of activated charcoal.

13. The apparatus of claim 7 in which the means for communicating the oil layer in air-excluding course with a lower entry to said pipe comprises a gathering horn set in said holding tank and having an encircling wall extending a distance below and a distance above said predetermined level, the wall being configured to converge from a wide first end to a smaller opposite end positioned below the predetermined level and connected with the lower entry to said vertical pipe.

14. The apparatus of claim 7 in which the oil-receiver tank drain means comprises a pipe manifold connected to said oil-receiver tank at said bottom location at an external side of the oil-receiver tank, the pipe manifold including a drain pipe and valve means for blocking and unblocking a flow course through said drain pipe.

15. The apparatus of claim 14 in which the pipe manifold includes an oil-receiver tank fill section for connecting the oil-receiver tank with a liquid filling source, said fill section having a valve therein for blocking and unblocking of flow therethrough.

16. The apparatus of claim 7 comprising indicator means for indicating filling presence of oil in said vertical pipe at predetermined height above the separation tank predetermined level.

17. The apparatus of claim 14 in which the indicator means comprises a sight glass in said vertical pipe.

18. The apparatus of claim 7 comprising a tube level indicator externally mounted on the oil-receiver tank, said tube level indicator communicating with the interior of the oil-receiver tank whereby liquid present in said oil-receiver tank accesses the level indicator in correspondence to the liquid level in the oil-receiver tank.

19. The apparatus of claim 8 in which the level control means includes a metering cap fitted to a lower end of said outflow pipe, said metering cap having a metering orifice therein, said metering orifice being effective to restrict the liquid outflow rate from the liquid pool in the separation tank to the said one rate rendering the super atmospheric pressure condition ineffective to force the pool liquid level downwardly to the said location below the predetermined level.

* * * * *